United States Patent
Schulz

(10) Patent No.: US 12,212,240 B2
(45) Date of Patent: Jan. 28, 2025

(54) METHOD FOR ACTUATING A BUCK-BOOST CONVERTER

(71) Applicant: Siemens Aktiengesellschaft, Munich (DE)

(72) Inventor: Stefan Schulz, Gnadendorf (AT)

(73) Assignee: Siemens Aktiengesellschaft, Munich (DE)

( * ) Notice: Subject to any disclaimer, the term of this patent is extended or adjusted under 35 U.S.C. 154(b) by 250 days.

(21) Appl. No.: 17/921,658

(22) PCT Filed: Apr. 13, 2021

(86) PCT No.: PCT/EP2021/059541
§ 371 (c)(1),
(2) Date: Oct. 27, 2022

(87) PCT Pub. No.: WO2021/219363
PCT Pub. Date: Nov. 4, 2021

(65) Prior Publication Data
US 2023/0170806 A1    Jun. 1, 2023

(30) Foreign Application Priority Data
Apr. 28, 2020   (EP) .................................... 20171760

(51) Int. Cl.
*H02M 3/158* (2006.01)
*H02M 1/00* (2006.01)

(52) U.S. Cl.
CPC ....... *H02M 3/1582* (2013.01); *H02M 1/0003* (2021.05); *H02M 1/0058* (2021.05)

(58) Field of Classification Search
CPC .... H02M 3/1582; H02M 3/158; H02M 3/156; H02M 3/157; H02M 3/1584;
(Continued)

(56) References Cited

U.S. PATENT DOCUMENTS

| | | | |
|---|---|---|---|
| 2012/0049822 A1 | 3/2012 | Li et al. | |
| 2015/0229215 A1* | 8/2015 | Choudhary | H02M 3/1582 323/271 |
| 2016/0056730 A1 | 2/2016 | Yan et al. | |

FOREIGN PATENT DOCUMENTS

| | | |
|---|---|---|
| CN | 101958650 | 1/2011 |
| EP | 2188886 B1 | 5/2012 |

(Continued)

OTHER PUBLICATIONS

Wen et al. "Analysis and Comparison of Frequency Stabilization Loops in Self-Oscillating Current Mode DC DC Converters", IEEE Transactions On Power Electronics, Institute Of Electrical And Electronics Engineers, USA, Bd. 28, Nr. 10, 1., pp. 4753-4766, Oct. 1, 2013.

(Continued)

*Primary Examiner* — Bryan R Perez
(74) *Attorney, Agent, or Firm* — Cozen O'Connor

(57) ABSTRACT

A method for actuating a DC-to-DC converter, in particular a clocked buck-boost converter that includes at least two switch elements and an inductor or throttle and via which an input voltage is converted into a regulated output voltage, wherein the switch elements are actuated with a variable switch frequency using pulse- and frequency-modulated control signals, where the pulse- and frequency-modulated control signals are derived from a manipulated variable from a regulator, a voltage curve on the switch elements is continuously ascertained or monitored to determine the activation time of the switch elements and to start a new switch cycle, the switch elements are activated if a specified minimum period duration has been exceeded upon detecting a voltage minimum of the ascertained voltage curve on the switch elements.

15 Claims, 3 Drawing Sheets

(58) Field of Classification Search
CPC ........... H02M 3/1588; H02M 3/33507; H02M 3/3376; H02M 3/155; H02M 3/33592; H02M 3/335; H02M 3/04; H02M 3/01; H02M 3/07
See application file for complete search history.

(56) References Cited

FOREIGN PATENT DOCUMENTS

| | | |
|---|---|---|
| EP | 2538532 | 12/2012 |
| EP | 2479878 B1 | 7/2016 |

OTHER PUBLICATIONS

Wen et al. "DC-DC Converter With Digital Adaptive Slope Control in Auxiliary Phase for Optimal Transient Response and Improved Efficiency", IEEE Transactions On Power Electronics, Institute Of Electrical And Electronics Engineers, USA, Bd. 27, Nr. 7, 1., pp. 3396-3409, Jul. 1, 2012.
Wang, Jian-Min et al. "A Synchronous Buck DC-DC Converter Using a Novel Dual-Mode Control Scheme to Improve Efficiency", IEEE Transactions on Power Electronics, Institute of Electrical and Electronics Engineers, USA, vol. 32, No. 9, pp. 6983-6993, Sep. 1, 2017.
PCT International Search Report and Written Opinion of International Searching Authority mailed Jul. 7, 2021 corresponding to PCT International Application No. PCT/EP2021/059541 filed Apr. 13, 2021.

* cited by examiner

METHOD FOR ACTUATING A BUCK-BOOST CONVERTER

CROSS-REFERENCE TO RELATED APPLICATIONS

This is a U.S. national stage of application No. PCT/EP2021/059541 filed 13 Apr. 2021. Priority is claimed on European Application No. 20171760.0 filed 28 Apr. 2020, the content of which is incorporated herein by reference in its entirety.

BACKGROUND OF THE INVENTION

1. Field of the Invention

The present invention generally relates to the field of electrical engineering, in particular the area of power electronics and power-electronics circuits and, more particularly, to a method for actuating a DC-to-DC converter, in particular a clocked buck-boost converter, which has at least two switching elements and an inductance or choke and by which an input voltage is converted into a regulated output voltage, where the switching elements of the buck-boost converter are actuated accordingly via pulse-width-modulated and frequency-modulated control signals at a common, variable switching frequency, and a respective pulse-width-modulated and frequency-modulated control signal for a respective switching element is derived from a manipulated variable, which is provided by a regulator unit for regulating the output voltage.

2. Description of the Related Art

Switching power supplies, which are also referred to as switchgears, are presently used in many fields (e.g., automation, and/or automotive field) as power supplies for, e.g., control units, electronic devices, controllers, and/or drives. Switching power supplies are particularly used to connect a load or a consumer to a power grid or a power source (for example, a battery) and to supply it with a typically constant and often predetermined voltage. For this purpose, a usually unstabilized input voltage (typically a DC or AC voltage originating from a power source) is converted by the switching power supply into a constant output voltage, where a consistency of the output voltage and/or the output current is achieved by a control of the energy flow in the switching power supply and the connected consumer. Depending on the application or depending on the need of the respective consumer, the output voltage can be greater or less than the input voltage.

Switching power supplies are known in greatly varying embodiments. For example, a rectification of the input voltage or the AC voltage in the switching power supply can be carried out for a connection to an AC voltage grid or an AC voltage source. For the conversion of the rectified input voltage or an unstabilized and/or varying DC voltage into a constant output voltage, DC-to-DC converters or DC-DC converters are typically used in switching power supplies. Furthermore, DC-to-DC converters can be used in particular in high-performance applications, for example, as a filter and/or for active power factor correction (PFC) in switching power supplies, for example, to keep negative influences on the power grid (a "grid feedback") as small as possible.

A DC-to-DC converter or DC-DC converter typically denotes an electric circuit that converts a DC voltage supplied at the input as the input voltage (for example, a rectified AC voltage or a DC voltage from a battery module) into an output voltage having higher, equal, or lower voltage level. A conversion of the input voltage into the usually predetermined output voltage is typically performed via at least one periodically operating electronic switching element and at least one energy storage device, which can be formed, for example, as an inductance ("inductive converter"), depending on the topology of the converter, in the form of a coil or choke or a converter transformer. In contrast thereto, converters having capacitive storage (capacitive converters) are designated as charge pumps.

DC-to-DC converters that are supposed to be able to supply an output voltage greater than, equal to, and/or less than an input voltage, depending on the application, are typically designated as buck-boost converters or step-up-step-down converters. In the buck-boost converter, for example, a boost converter or step-up converter is connected downstream of a buck converter or step-down converter. Here, both the buck converter and also the boost converter each have at least one switching element and share a common energy storage device embodied as an inductance or coil. Exemplary circuits of a buck-boost converter are known, for example, from documents EP 2 188 886 B1 or EP 2 479 878 B1.

Buck-boost converters are used in case of varying input voltages, for example, a rectified AC voltage, which has a ripple or residual ripple. The buck-boost converter operates here in different operating modes in dependence on a ratio between input and output voltages. If the input voltage is, for example, greater than the output voltage, then the buck-boost converter is only operated in the buck mode. That is, in this mode only the switching element of the buck converter is switched, while the switching element of the boost converter remains consistently switched off. If a difference voltage between input and output voltages of the buck-boost converter falls below a specific minimum value, then the buck-boost converter is thus typically operated in the so-called mixed mode. That is, both the switching element of the buck converter and the switching element of the boost converter are clocked at identical frequency, but different switching-on times. An actuation for a buck-boost converter can include, for example, a pulse width modulator, the duty cycle of which can be changed for the purpose of regulation, for example, to constant output voltage.

For the actuation of a buck-boost converter which has, for example, two or four switching elements and a common inductance or choke, there are actuation units available on the market, for example, which can be used in particular at lower input or output voltages (for example up to 50 V). These actuation units operate the buck-boost converter, for example, at a fixed switching frequency, i.e., the switching elements are switched using a fixed number of switching-on and switching-off processes per time interval. This has the disadvantage in particular at higher input and output voltages that the switching elements are not switched on at the optimum point in time and that due to the fixed-frequency actuation, high switching losses and high interference emissions (for example in the form of noise and/or electromagnetic radiation (EMC interference)) can occur.

Above all in a continuous mode (continuous conduction mode (CCM)), but also in a discontinuous or intermittent mode (discontinuous conduction mode (DCM)) of the buck-boost converter, in which the respective switching element is switched on after the inductance is demagnetized and a dead time occurs, high switching losses can occur in the case of fixed-frequency actuation of the switching elements, if parasitic capacitances, which are contained, for example, in switching elements (for example, field-effect transistors) and in inductances (for example, transformers, or chokes), are charged before the next switching-on point in time to correspondingly high voltages. When the switching element switches on in the next clock cycle, the parasitic capacitors are discharged or recharged via the transistor and generate greater or lesser current peaks depending on the applied voltage, which result in high switching losses in the event of correspondingly high voltage.

An actuation method for a buck-boost converter having four switching elements is known from the document by S. Waffler et al., "A Novel Low-Loss Modulation Strategy for High-Power Bi-directional Buck+Boost Converters", IEEE Transactions on Power Electronics, Vol. 24, No. 6, pages 1589-1599, June 2009. Here, the switching elements are always switched on during a zero voltage to minimize switching losses. That is, zero-voltage switching (ZVS) is performed. For this purpose, the switching elements are deliberately actuated to achieve the zero-voltage switching condition, in order to always ensure a negative current in the inductance at the beginning and at the end of a switching period, due to which no parasitic capacitances have to be hard recharged. Such an actuation can also be used at relatively high input or output voltages (for example, at input voltages from 100 up to 1000 V). However, it requires a complex, costly, and component-intensive circuit structure having, for example, four switching elements and a fast, for example, completely digitally implemented actuation.

To minimize the switching losses, in particular at high input and output voltages, "quasi-resonant switching" or "valley switching" of the switching elements of the buck-boost converter can be attempted, for example. In quasi-resonant switching, for example, a minimum (also called a "valley") of the voltage on at least one switching element of the converter is recognized via a recognition circuit and the at least one switching element is only switched on at this point in time. The switching-on current peak is thus minimized, because the parasitic capacitance is discharged to the minimum voltage and a reduction of the switching losses and the interference radiation is achieved. The switching-on during a valley causes a continuous reset of the period beginning (pulse reset) and thus an adaptation of the switching frequency.

If, for example, switching on is always performed during a valley occurring first in time in a switching period, then the switching frequency thus increases with decreasing load until a maximum frequency is reached in the no-load state. However, the switching losses also increase with increasing frequency, because more loss-causing switching processes occurs per unit of time. To avoid excessively high switching frequencies at low load, in general the switching-on point in time is displaced to a later valley. It can occur here that at specific powers, it is necessary to jump back and forth between the valleys to keep the output voltage constant. This effect is also called "valley skipping".

EP 2 538 532 A1 discloses a conventional actuation method for a DC-DC converter, which is operated in the discontinuous mode using variable switching frequency or using quasi-resonant switching. To be able to always switch on the switching elements in a valley in the case of a variable load at the output of the converter, the switching frequency is tracked using a trailing synchronization circuit. If, for example, a sudden change of the output power or a rapid change of the input voltage occurs, in this actuation method, the switching elements are thus not always switched in a valley at least in a transition area, until the switching frequency is readjusted. This can have the result, for example, with an unfavorable combination of changing load and changing or varying input voltage that the switching elements are never switched in a valley if, for example, the readjustment of the switching frequency takes place too slowly. Therefore, the actuation method described in EP 2 538 532 A1 has the disadvantage that in spite of a use of "quasi-resonant switching", high switching losses and high interference emissions can occur.

SUMMARY OF THE INVENTION

In view of the foregoing, it is therefore an object of the invention to provide a method for actuating a clocked buck-boost converter, via which an improvement in relation to the prior art is achieved in a simple and cost-effective manner, in particular a further reduction of switching losses and interference emissions or EMC interference, above all in the case of high, rapidly varying input voltages and/or rapidly varying load conditions at the output.

This and other objects and advantages are achieved in accordance with the invention by a method for actuating a buck-boost converter which has at least two switching elements and an inductance or choke or coil and by which an input voltage is converted into a regulated output voltage which can be, for example, greater than, equal to, or less than the input voltage. For this purpose, the two switching elements are each actuated using a pulse-width-modulated and frequency-modulated control signal. The control signals have a common, variable switching frequency, here. The respective pulse-width-modulated and frequency-modulated control signal for actuating a respective switching element is derived from a manipulated variable, which is provided by a regulator unit for regulating the output voltage of the buck-boost converter. For switching on the two switching elements, a voltage curve on the switching elements is continuously ascertained or monitored. Upon recognizing a voltage minimum of the ascertained voltage curve on the switching elements, the two switching elements are (simultaneously) switched on and thus a new switching cycle is started if a predetermined minimum period duration has been exceeded. If no voltage minimum is established in the ascertained voltage curve on the switching elements until the passage of the predetermined maximum period duration, then the two switching elements of the buck-boost converter are thus switched on at or after passage of a predetermined maximum period duration. A maximum switching frequency for clocking the switching elements, which is not to be exceeded, is defined here by the predetermined minimum period duration. A minimum switching frequency, which is not to be fallen below, is established by the predetermined maximum period duration.

The main aspect of the proposed solution in accordance with the invention is that it is ensured by a corresponding actuation of the switching elements of the buck-boost converter that the common, variable switching frequency of the two switching elements does not exceed or fall below predetermined limits at the top and bottom, i.e., a predetermined maximum and minimum switching frequency. This is essentially achieved by the specification of a minimum and a maximum period duration for a common switching cycle of the two switching elements. In each switching cycle, the period duration which has passed is monitored and the two switching elements are switched on simultaneously at a possible optimum switching-on point in time, i.e., the predetermined minimum period duration has passed and the voltage curve at the switching elements has a minimum (valley), and thus a new switching cycle is triggered.

It is possible due to the actuation method in accordance with the invention to use the two switching elements of the buck-boost converter even with variable input and output voltage and with variable load, even with a suddenly changing output power or a suddenly changing input voltage to always switch on the voltage applied at the two switching elements in a voltage minimum (valley), if the voltage curve applied on the switching elements has a minimum before passage of the predetermined maximum period duration. Relatively low switching losses and a low interference emission, especially at high input and output voltages (for example, 100 up to 1000 V) can be achieved in a simple manner and a significantly higher efficiency can be ensured.

Furthermore, using the method in accordance with the invention, a buck-boost converter which only has two switching elements (e.g., transistors, and/or MOSFETs) and two diodes in the power part, can be operated with low switching losses and low interference emission very easily. Actuation expenditure and costs for a circuitry implementation of the method in accordance with the invention are thus also linked to lower efforts and costs. Furthermore, a device or the switching power supply can be constructed more compactly due to less waste heat due to the lower switching losses because of the actuation method in accordance with the invention.

It is furthermore advantageous if a switching-off point in time of the respective switching element is defined by the manipulated variable provided by the regulator unit, from which the respective pulse-width-modulated and frequency-modulated control signal for the respective switching element is derived. This means that each of the two switching elements of the buck-boost converter is switched on at the same point in time, but is switched off at a point in time resulting from the regulation of the output voltage and predetermined by the respective control signal for the respective switching element. In this case, however, the period duration and switching frequency at which the two switching elements are clocked are identical.

It is also advantageous here if, in order to generate the respective pulse-width-modulated and frequency-modulated control signal for clocking the respective switching element, a manipulated variable specific to the respective switching element is derived from the manipulated variable provided by the regulator unit to regulate the output voltage as a function of the respective input voltage and the respective output voltage of the buck-boost converter. The respective switching element-specific manipulated variable can then be used for the respective control signal for actuating the respective switching element, where the control signals are ideally configured in such a way that the switching elements are switched on simultaneously and are switched off individually, for example, in accordance with an operating mode of the buck-boost converter and/or for a regulation of the output voltage to a predetermined value or as a function of a ratio of the input voltage to the output voltage. A possible method for such a regulation of a buck-boost converter or for deriving corresponding manipulated variables is described, for example, in European patent application EP 20171701.4 (no prior publication).

Furthermore, it is advantageous if a sawtooth signal, which is generated by an oscillator unit, is used to generate the pulse-width-modulated and frequency-modulated control signals for the switching elements. Ideally, a predeterminable offset value is added to this sawtooth signal. Due to an addition of the offset value to the signal generated using the oscillator unit, it is ensured, for example, that the pulse-width-modulated and frequency-modulated control signals and thus the switching elements can be switched off completely by the regulator unit. This prevents, for example, a minimum switching-on time from possibly being left over if the regulator unit cannot regulate down correctly to a manipulated variable of 0 V.

In one preferred embodiment of the invention, a voltage regulator having a subordinate current regulation is used as a regulator unit for regulating the output voltage of the buck-boost converter. In particular, an average current mode control can be used as a regulator unit. In this case, a voltage regulator specifies on the basis of an actual value and target value, for example, the output voltage of the buck-boost converter, a mean current target value, for example, for a mean value of a current through the inductance or choke of the buck-boost converter to a subordinate current regulator. The current, for example, through the choke is then indirectly or directly detected by the subordinate current regulator and then the manipulated variable is generated, which is used to derive the pulse-width-modulated and frequency-modulated control signals for switching or clocking the switching elements of the buck-boost converter or for ascertaining the switching-off points in time of the individual switching elements.

Furthermore, a voltage measurement can advantageously be performed on at least one of the switching elements of the buck-boost converter for ascertaining or monitoring the voltage curve on the switching elements and for recognizing a voltage minimum or valley in the voltage curve. A unit for recognizing voltage minima or valleys can ideally be constructed here such that the voltage curves are only monitored on one of the two switching elements, because the voltage minima or valleys always occur simultaneously at the two switching elements. If a minimum is recognized in the voltage curve on one of the switching elements, for example, a pulse can thus be output, which is used by the actuation method.

A positive zero crossing of the current in the inductance or choke is achieved simultaneously with a minimum in the voltage curve on the switching elements. Consequently, alternatively or additionally to recognizing a minimum or a valley in the voltage curve on the switching elements, a current curve through the inductance or choke of the buck-boost converter can be used and evaluated. For this purpose, for example, the current curve through the inductance of the buck-boost converter can be detected with the aid of a current measuring resistor. If a positive zero crossing is established in the detected current curve, for example, a pulse can thus be generated which is used by the actuation method.

Alternatively or additionally, the voltage curve on an auxiliary winding of the inductance or choke of the buck-boost converter can also be used and evaluated. Positive zero crossings of a voltage on an auxiliary winding of the inductance or choke of the buck-boost converter occur simultaneously with horizontal slope in the current curve through the inductance or choke of the buck-boost converter and this takes place exactly 90°, with respect to a valley oscillation period, before a minimum in the voltage curve on the switching elements or a positive zero crossing of the current in the inductance or choke. If a positive zero crossing is established in the detected voltage curve of an auxiliary winding of the inductance or choke of the buck-boost converter, after passage of a constant delay, with the duration corresponding to 90° of a valley oscillation period. a pulse can thus be generated which is used by the actuation method.

Furthermore, it is advantageous if the predetermined minimum period duration, by which a maximum switching frequency for the switching elements is defined, can be determined based on a predeterminable efficiency of the buck-boost converter or based on predetermined maximum interference emissions in a specific frequency range. Excessively high switching losses and possible excessively high interference emissions can be prevented very easily by specifying the minimum period duration or the maximum switching frequency and thus a predeterminable efficiency or predeterminable maximum interference emissions in a specific frequency range can be achieved.

The predetermined maximum period duration, by which a minimum switching frequency for the switching elements is defined, can expediently also be ascertained from a dynamic response of the regulator unit. Due to the specification of a maximum period duration or a minimum switching frequency, in particular with increasing output power, instabilities of the regulator unit or in the control loop are prevented from occurring. In particular if, for example, the variable switching frequency comes too close to a gain crossover frequency of the control loop, instabilities can occur. Above all during operation of the buck-boost converter at very high output power, excessive decreasing of the switching frequency when switching on the switching elements in a voltage minimum (i.e., in quasi-resonant switching) can be prevented by corresponding specification of the maximum period duration. A control loop can thus be dimensioned, using which dynamic processes (e.g., changes of the input voltage, and/or changes of the load) can be regulated out rapidly.

The buck-boost converter is ideally operated in dependence on the input voltage and the output voltage in a buck converter mode and/or in a mixed mode. In the event of varying input and output voltages and varying load conditions at the buck-boost converter, the input voltage can thus be converted very easily into a regulated, predetermined output voltage, which is greater than, equal to, or less than the input voltage. In the buck converter mode, only a first switching element of the two switching elements is clocked as a buck converter switching element here. A second switching element, which functions as a boost converter switching element, remains switched off in the buck converter mode. In the mixed mode, both switching elements are clocked, where the first switching element is still used as a buck converter switching element and a second switching element of the two switching elements is used as a boost converter switching element.

Furthermore, it is advantageous if the buck-boost converter is operated in a continuous mode and in a discontinuous mode. The buck-boost converter is then in particular switched in the discontinuous mode at an optimum point in time by the actuation method in accordance with the invention, i.e., the two switching elements are switched on at the optimum switching-on point in time, where this is within a time span which is predetermined by the minimum and the maximum period duration.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained hereinafter in an exemplary manner on the basis of the appended figures, in which.

DETAILED DESCRIPTION OF THE EXEMPLARY EMBODIMENTS

Figure 1:
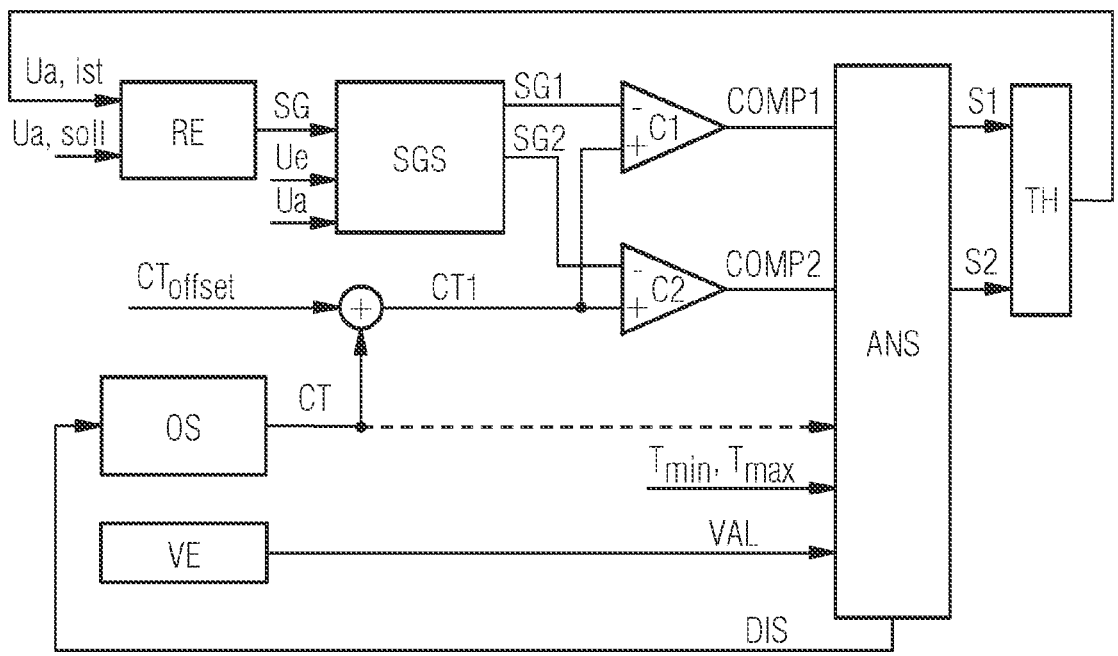
FIG. 1 shows an exemplary system for implementing the method in accordance with the invention for actuating a DC-to-DC converter, in particular a buck-boost converter.

FIG. 1 schematically shows an exemplary system for carrying out the method in accordance with the invention for actuating a buck-boost converter TH. A buck-boost converter TH can convert an input voltage Ue into a regulated output voltage Ua, which is greater than, equal to, or less than the input voltage Ue. For this purpose, the buck-boost converter can be operated in dependence on a ratio between input voltage Ue and output voltage Ua in different modes, for example, in a buck converter mode and/or a mixed mode.

The buck-boost converter TH comprises for this purpose, for example, a buck converter, to which a boost converter is connected downstream. A circuit assembly for a buck-boost converter TH has, for example, an inductance or choke, which is used both by the buck converter part and also by the boost converter part of the buck-boost converter TH as an energy storage device. Furthermore, the buck-boost converter TH has in the power part, for example, two switching elements and two diodes, where within the buck converter part a first switching element as a buck converter switching element and a diode and within the boost converter part a second switching element as a boost converter switching element and a diode are used.

The two switching elements of the buck-boost converter TH are actuated by pulse-width-modulated and frequency-modulated control signals S1, S2 using a common variable switching frequency.

A first control signal S1 is used here for an actuation of the first switching element or the buck converter switching element and a second control signal S2 is used for an actuation of the second switching element or the boost converter switching element. For a derivative of the pulse-width-modulated and frequency-modulated control signals S1, S2, a control loop for regulating the output voltage Ua, ist is set to a predeterminable target value Ua, soll, where the average current mode control is used as a regulating method, for example. For this purpose, a regulator unit RE is used, which is formed, for example, as a voltage regulator having a subordinate current regulation. Here, a mean current target value, for example, for a mean value of a current through the choke of the buck-boost converter, is predetermined to a subordinate current regulator by a voltage regulator, for example, based on a predeterminable target value Ua, soll and a present output voltage Ua, ist of the buck-boost converter TH. The current, for example, through the choke is then detected indirectly or directly by the subordinate current regulator and then a manipulated variable SG is generated, which is used to derive the pulse-width-modulated and frequency-modulated control signals S1, S2 for switching or clocking the switching elements of the buck-boost converter TH.

Separate manipulated variables SG1, S22 can then be derived via a unit for manipulated variable control SGS as a function of the input voltage Ue and output voltage Ua for each switching element of the buck-boost converter. In this case, for example, a first manipulated variable SG1 for the first switching element or for a derivative of the first control signal S1 and a second manipulated variable SG2 for the second switching element or for a derivative of the second control signal S2 can be ascertained from the manipulated variable SG provided by the regulator unit RE. One possible method for deriving these corresponding manipulated variables SG1, SG2 is described, for example, in European patent application EP 20171701.4 (no prior publication).

Then, for example, a switching-off point in time of the respective switching element of the buck-boost converter TH is defined from the manipulated variable SG provided by the regulator unit RE or from the manipulated variables SG1, SG2 derived therefrom. Thus, for example, the first manipulated variable SG1 can specify a switching-off point in time for the first switching element or the buck converter switching element and the second manipulated variable SG2 can specify a switching-off point in time for the second switching element or the boost converter switching element.

To derive the two pulse-width-modulated and frequency-modulated control signals S1, S2, in particular of the different switching-off points in time of the two switching elements, from the two manipulated variables SG1, S22, the different manipulated variables SG1, SG2 are compared, for example, with the aid of comparator units C1, C2 to a sawtooth signal CT1. For this sawtooth signal CT1, for example, an offset value CToffset is added to a sawtooth signal CT, which is generated by an oscillator unit OS (for example, a sawtooth generator). The two comparator units C1, C2 supply two items of comparator signal information COMP1, COMP2, which are used by an actuation unit ANS to derive the pulse-width-modulated and frequency-modulated control signals S1, S2, above all for the switching-off points in time of the switching elements.

In order to be able to change the common switching frequency or be able to ascertain the switching-on point in time of the two switching elements for the control signals S1, S2, a minimum period duration Tmin and a maximum period duration Tmax are specified to the actuation unit ANS. The minimum period duration Tmin defines a maximum switching frequency, using which the switching elements are to be clocked. The minimum period duration Tmin can be selected, for example, based on a predeterminable efficiency of the buck-boost converter or predeterminable maximum interference emissions in a specific frequency range, in order to prevent excessively high switching losses and possibly excessively high interference emissions. The maximum period duration Tmax establishes a minimum switching frequency for clocking the switching elements and can be determined from a dynamic response of the control loop or the regulator unit RE, for example, to prevent instabilities of the regulator unit RE or in the control loop, which can occur above all if the variable switching frequency comes excessively close to a gain crossover frequency of the control loop.

Furthermore, for example, a recognition signal VAL for recognizing voltage minima of a voltage curve on the switching elements of the buck-boost converter TH is applied to the actuation unit ANS. The recognition signal VAL can be generated, for example, by a unit for monitoring the voltage curve on the switching elements of the buck-boost converter TH and for recognizing voltage minima or valleys in this voltage curve (a valley recognition unit VE). For this purpose, for example, a voltage measurement can be carried out on the switched off switching elements of the buck-boost converter TH. If a voltage minimum or valley is established by the voltage measurement in the voltage curve on the switched off switching elements, for example, then a pulse can thus be generated by the valley recognition unit VE.

Alternatively or additionally, a current curve through the inductance or choke of the buck-boost converter TH can also be monitored and the voltage minima or valleys in the voltage curve on the switching elements can be derived therefrom. A voltage minimum or valley is achieved with a positive zero crossing of the current through the inductance. As a result, a pulse can be generated by the valley recognition unit VE, for example, upon each positive zero crossing of the current through the inductance. The pulses are then passed on as the recognition signal VAL to the actuation unit ANS.

Furthermore, there is also the possibility that alternatively or additionally positive zero crossings of a voltage on an auxiliary winding of the inductance or choke of the buck-boost converter TH are evaluated, which signal points in time having horizontal slope in the current curve through the inductance or choke of the buck-boost converter TH, which each occur 90°, with respect to a valley oscillation period, before a voltage minimum or valley. The valley recognition unit VE has to insert a constant delay having the duration of 90° of a valley oscillation period in this case between a recognized positive zero crossing of the voltage on an auxiliary winding and the generation of a pulse on the recognition signal VAL.

The actuation unit ANS, above all with an analog implementation of the actuation unit ANS, for example, is possibly also provided the sawtooth signal CT generated by the oscillator unit OS, to define the limits of the variable switching frequency, i.e., maximum and minimum switching frequency, therefrom. With digital implementation variants of the actuation unit ANS, these limits can be implemented, for example, via counter units.

Furthermore, a setting signal DIS can be generated by the actuation unit ANS, by which the oscillator unit OS is reset at the switching-on point in time of the switching elements. That is, the sawtooth signal CT of the oscillator unit is set to zero and a new sawtooth CT or a new switching cycle is started.

Figure 2:
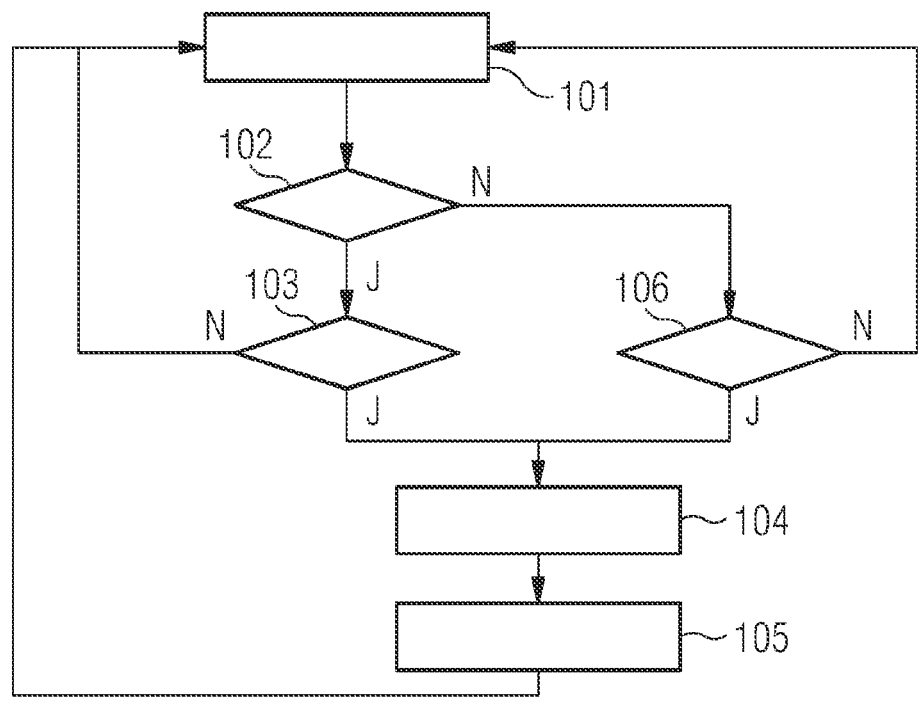
FIG. 2 shows an exemplary sequence of the method in accordance with the invention for actuating a buck-boost converter.

Switching on and off of the two switching elements of the buck-boost converter TH, which is triggered by the control signals S1, S2, is performed, for example, by the actuation unit ANS in accordance with the method in accordance with the invention. An exemplary sequence of the method in accordance with the invention for actuating a buck-boost converter TH is schematically shown in FIG. 2. This sequence can be performed, for example, using the system shown in FIG. 1, in particular by the actuation unit ANS.

To determine the common switching-on point in time of the two switching elements of the buck-boost converter TH, in a monitoring step 101, for example, the voltage curve on the two switching elements of the buck-boost converter TH is continuously ascertained and monitored by the valley recognition unit VE. For this purpose, for example, a voltage measurement can be performed on the two switching elements or the curve of the current through the inductance or choke of the buck-boost converter TH can be monitored or the voltage curve on an auxiliary winding of the inductance or choke of the buck-boost converter can be measured. The two switching elements are switched off in this case.

If, for example, in a recognition step 102, a voltage minimum in the voltage curve on the switching elements (for example, due to voltage measurement or based on a positive zero crossing of the current through the choke) is recognized by the valley recognition unit VE, a pulse for the recognition signal VAL can thus be generated, for example, and passed on to the actuation unit ANS.

If a voltage minimum or valley is recognized, it is checked in a first checking step 103 whether the minimum period duration Tmin has been reached or exceeded. For this purpose, for example, the actuation unit ANS can check upon receiving a pulse of the recognition signal VAL whether the minimum period duration Tmin has been reached. If the minimum period duration Tmin has not yet been reached, in monitoring step 101, the voltage curve on the two switching elements of the buck-boost converter TH is thus ascertained by the valley recognition unit VE and in recognition step 102, a check is made for the recognition of a further voltage minimum or valley in the voltage curve on the switching elements. Upon recognition of a further voltage minimum, in first checking step 103, reaching the minimum period duration Tmin is again checked.

If it is established in first checking step 103 upon recognition of a valley that the minimum period duration has been reached or exceeded, in a switching-on step 104, the two switching elements of the buck-boost converter TH are thus switched on. For this purpose, for example, the two control signals S1, S2 can be set by the actuation unit ANS and simultaneously the setting signal DIS for the oscillator unit OS can be generated, to reset the oscillator unit OS or the sawtooth signal CT. With switching-on step 104 or the switching-on of the two switching elements of the buck-boost converter TH, a new switching cycle is started and the switching frequency for clocking the switching elements is varied.

In a switching-off step 105, the two switching elements are then switched off in accordance with the desired switching-on times. The switching-off point in time of the respective switching element of the buck-boost converter is predetermined, for example, by the respective manipulated variable SG1, SG2, which was derived from the manipulated variable SG provided by the regulator unit RE for regulating the output voltage Ua. Based on the respective manipulated variables SG1, SG2, a respective item of comparator signal information COMP1, COMP2 is created for the respective switching elements, for example, via comparator units C1, C2. Based on this comparator signal information COMP1, COMP2, the respective control signal S1, S2 is then reset, for example, by the actuation unit ANS, to switch off the associated switching element. In a buck-boost converter TH, which is operated in the mixed mode, where the boost converter switching element is typically switched off first here and then the buck converter switching element. In a buck converter mode of the buck-boost converter TH, only the buck converter switching element or the first switching element is clocked, while the boost converter switching element or the second switching element remains switched off.

If, for example, no voltage minimum in the voltage curve on the switching elements (for example, by voltage measurement or based on a positive zero crossing of the current through the choke) is recognized by the valley recognition unit VE in recognition step 102, in a second checking step 106, which can be performed, for example, in particular after reaching the minimum period duration Tmin, for example, by the actuation unit ANS, it is checked whether the maximum period duration Tmax has passed. As long as the maximum period duration Tmax has not yet been reached, the voltage curve on the two switching elements of the buck-boost converter TH is still ascertained in monitoring step 101 by the valley recognition unit VE and the recognition of a further voltage minimum or valley in the voltage curve on the switching elements is checked in recognition step 102. If no voltage minimum or valley is recognized up to the passage of the maximum period duration Tmax, switching-on step 104 is thus carried out. That is, the switching elements, even without recognized voltage minimum in the voltage curve on the switching elements, are switched on "hard" so as not to fall below a minimum switching frequency and to start a new switching cycle. Furthermore, the setting signal DIS for the oscillator unit OS for resetting the sawtooth signal CT is also generated and sent to the oscillator unit. The switching elements of the buck-boost converter TH are then switched off again according to switching-off step 105 and the respective switching-off points in time.

If, after switching-off step 105, both switching elements of the buck-boost converter are switched off, the method can be started again with monitoring step 101 to determine the next optimum switching-on point in time, i.e., switching-on the two switching elements at a voltage minimum or valley, for the control signals S1, S2 and to start the next switching cycle.

An implementation of the method in accordance with the invention or the actuation unit ANS for the actuation of the switching elements or the generation of the control signals S1, S2 can occur in an analog manner, for example, with the aid of comparators and reset-set or RS flip-flops. Corresponding voltage and signal curves for these analog implementation variants are shown by way of example in FIG. 3*a*.

Figure 3A:
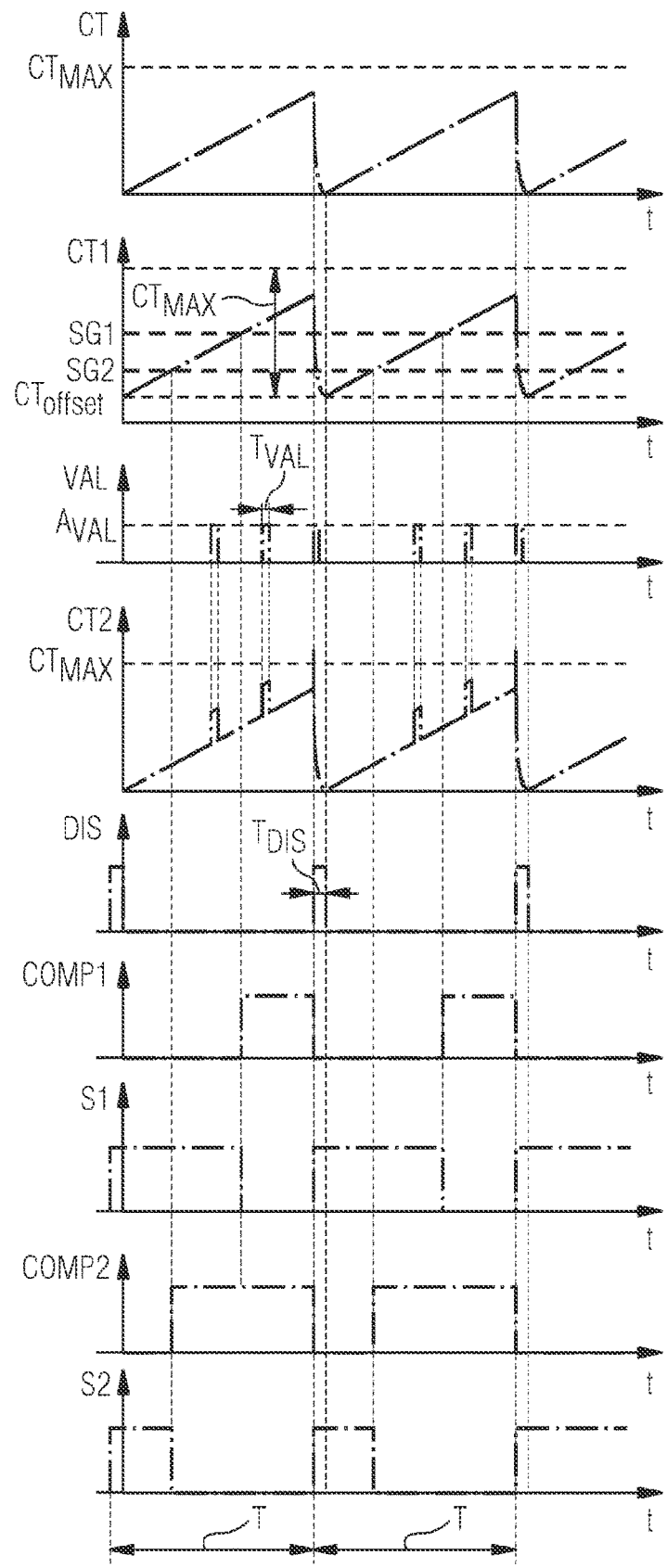
FIG. 3a shows exemplary graphical plots of voltage and signal curves for actuating switching elements of a buck-boost converter with an analog actuation implementation.

FIG. 3*a* shows here, in a signal curve CT, a time curve of the sawtooth signal CT, which is generated by the oscillator unit OS. In the first signal curve, a maximum value CTmax for the sawtooth signal CT is plotted, by which the maximum period duration Tmax is predetermined.

The shifted sawtooth signal CT1, which is shown by way of example in a signal curve CT1, is derived from the sawtooth signal CT by addition of an offset value CToffset. The shifted sawtooth signal CT1 is compared, for example, by the comparator units C1, C2, to the manipulated variables SG1, SG2 plotted in the second signal curve. The first manipulated variable SG1 is assigned to the first switching element or the buck converter switching element. The second manipulated variable SG2 is assigned to the second switching element or the boost converter switching element. The respective switching-off points in time of the two switching elements are derived from a comparison of the shifted sawtooth signal CT1 to the two manipulated variables SG1, SG2.

The comparison of the shifted sawtooth signal CT1 to the first manipulated variable SG1, for example, by a comparator unit C1, supplies a first item of comparator signal information COMP1, which is shown in the signal curve COMP1 and from which via the actuation unit ANS, the switching-off point in time of the first switching element or the buck converter switching element for the first pulse-width-modulated and frequency-modulated control signal S1 is determined. An exemplary curve of the first control signal S1 for the buck converter switching element is shown here as signal curve S1. If the shifted sawtooth signal CT1 exceeds the first manipulated variable SG1, for example, via a comparator unit C1, the first item of comparator signal information COMP1 is thus set and the first control signal S1 is reset, by which the buck converter switching element is switched off.

Similarly, the comparison of the shifted sawtooth signal CT1 to the second manipulated variable SG2, for example, via the comparator unit C2, supplies the switching-off point in time for the second switching element or the boost converter switching element. For this purpose, a second item of comparator signal information COMP2 is ascertained from the comparison, which is shown in the signal curve COMP2. From the second item of comparator signal information COMP2 the switching-off point in time of the boost converter switching element is then ascertained by the actuation unit ANS for the second pulse-width-modulated and frequency-modulated control signal S2 (shown in the signal curve S2). If the shifted sawtooth signal CT1 exceeds the second manipulated variable SG2, for example, via a comparator unit C2, the second item of comparator signal information COMP2 is thus set and the second control signal S2 is reset, by which the boost converter switching element is switched off. If, for example, the second manipulated variable SG2 is less than the offset value CToffset, the boost converter switching element is then not clocked, but rather remains switched off, i.e., the buck-boost converter TH operates in the buck converter mode.

In a signal curve VAL, the recognition signal VAL is shown by way of example, which is generated by the valley recognition unit VE. Each pulse of the illustrated signal curve VAL corresponds here to a recognized voltage minimum or valley in the voltage curve on the switching elements of the buck-boost converter TH. The pulses have, for example, a defined amplitude $A_{VAL}$ and a defined pulse width $T_{VAL}$. The amplitude $A_{VAL}$ can be defined here, for example, such that the maximum switching frequency and thus the minimum period duration Tmin is ascertainable from a ratio of the amplitude $A_{VAL}$ to the maximum value CTmax. That is, the maximum switching frequency, which is determined by the predetermined minimum period duration Tmin, can be predetermined by corresponding definition of the amplitude $A_{VAL}$ of the pulses of the recognition signal VAL.

The recognition signal VAL is evaluated, for example, by the actuation unit ANS. For this purpose, for example, a sum signal CT2 (shown in the signal curve CT2) is formed from the sawtooth signal CT and the recognition signal VAL. This sum signal CT2 is then compared, for example, via a comparator unit by the actuation unit ANS to the maximum value CTmax. If the maximum value CTmax is exceeded by the sum signal CT2, then a setting signal DIS is triggered, which has a width $T_{DIS}$ and is shown in a signal curve DIS.

Furthermore, the oscillator unit OS or the sawtooth signal CT of the oscillator unit OS is reset by the setting signal DIS. The two items of comparator signal information COMP1, COMP2 thus also tilt back again and, for example, the control signals S1, S2 of the switching elements of the buck-boost converter are set via RS flip-flops and thus a new switching cycle is started. That is, the two switching elements are switched on simultaneously.

Alternatively, the actuation method in accordance with the invention, in particular the actuation unit ANS, can also be digitally implemented. For this purpose, for example, a microcontroller, a programmable logic device (PLC), or other digital components can be used. Voltage and signal curves for a digital implementation variant, for example, via a programmable logic device (PLD) are shown by way of example in FIG. 3b.

Figure 3B:
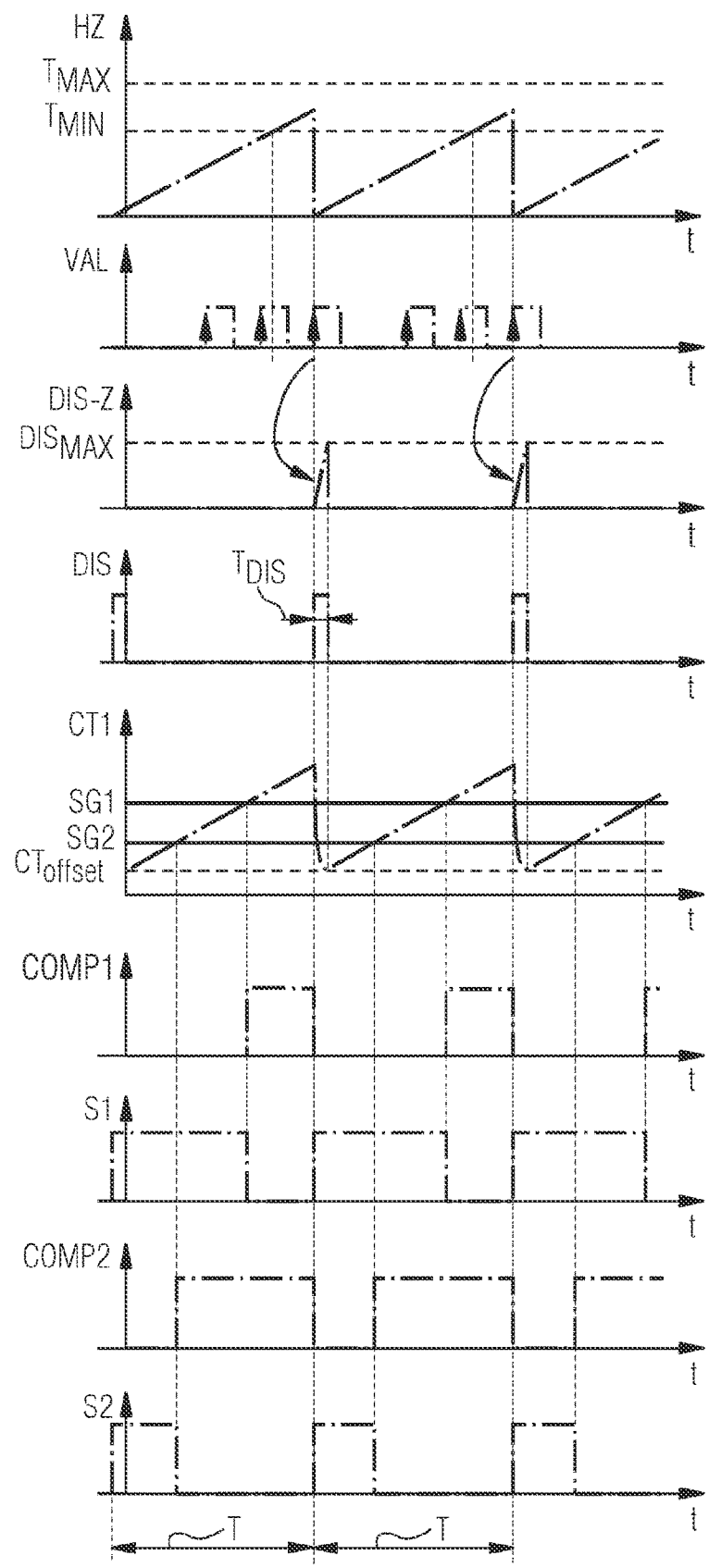
FIG. 3b shows exemplary graphical plots of voltage and signal curves for actuating switching elements of a buck-boost converter with a digital actuation implementation.

With a digital implementation of the actuation unit ANS, the limiting of the switching frequency or the checking of the predetermined minimum and maximum period duration can be implemented, for example, via a counter unit HZ. Furthermore, a counter unit DIS-Z can likewise be used for the implementation of the defined width of the setting signal DIS. In FIG. 3b, the graphic representations of the counter units HZ, DIS-Z are shown by way of example in the curves HZ, DIS-Z.

The curve HZ shows, for example, a graphic representation of the counter unit HZ, which overflows at a predetermined maximum value Tmax fix. This maximum value corresponds to the predetermined maximum period duration Tmax, by which the minimum switching frequency can be defined. Furthermore, the minimum period duration Tmin is plotted in the curve HZ, which establishes the maximum switching frequency and is not to be fallen below.

An exemplary curve of the recognition signal VAL, which is generated by the valley recognition unit VE, is again shown in the signal curve VAL. The positive flanks of the pulses of the signal curve VAL again indicate recognized voltage minima or valleys in the voltage curve on the switching elements of the buck-boost converter TH. If a rising flank of a pulse of the recognition signal VAL falls in an area of the counter curve HZ between the limits Tmin and Tmax, then the counter unit HZ is thus reset and the setting signal DIS, shown in the signal curve DIS, is generated and the counter unit DIS-Z (graphically represented in the curve DIS-Z) is triggered. The counter unit DIS-Z has, for example, an overflow value $DIS_{MAX}$, by which the pulse width $T_{DIS}$ is defined.

Furthermore, the oscillator unit OS or the sawtooth signal CT of the oscillator unit OS is reset by the setting signal DIS, by which the two items of comparator signal information COMP1, COMP2 also tilt back again. The two pulse-width-modulated and frequency-modulated control signals S1, S2 are thus set. These are shown in the corresponding signal curves S1, S2, COMP1, COMP2. The two switching elements of the buck-boost converter TH are switched on by the setting of the control signals S1, S2 and a new switching cycle is started.

Furthermore, the signal curve CT1 of the shifted sawtooth signal CT1 is again shown in FIG. 3b, which is generated from the sawtooth signal CT of the oscillator unit OC shifted by the offset value CToffset. The switching-off points in time for the two switching elements are derived with the aid of the first and second manipulated variable SG1, SG2 from the sawtooth signal CT1, as already described in the signal curves in FIG. 3a.

With the aid of the actuation method according to the invention, in a simple manner, the two pulse-width-modulated and frequency-modulated control signals S1, S2 are always set at the same point in time and thus the switching elements are switched on at a common switching-on point in time. Due to the different manipulated variables SG1, ST2 for the two switching elements, the two pulse-width-modulated and frequency-modulated control signals can be reset at different switching-off points in time. In addition, it is possible that the boost converter switching element remains constantly switched off or the associated second control signal S2 remains constantly reset if the second manipulated variable SG2 for the boost converter switching element is less than the offset value CToffset. That is, only the first switching element or the buck converter switching element is clocked and the buck-boost converter TH is operated in the buck converter mode.

Thus, while there have been shown, described and pointed out fundamental novel features of the invention as applied to a preferred embodiment thereof, it will be understood that various omissions and substitutions and changes in the form and details of the methods described and illustrated may be made by those skilled in the art without departing from the spirit of the invention. For example, it is expressly intended that all combinations of those method steps which perform substantially the same function in substantially the same way to achieve the same results are within the scope of the invention. Moreover, it should be recognized method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for actuating a buck-boost converter having a plurality of switching elements and an inductance, via which an input voltage is converted into a regulated output voltage, the at least two switching elements of the buck-boost converter being actuated by pulse-width-modulated and frequency-modulated control signals utilizing a common, variable switching frequency, and a respective pulse-width-modulated and frequency-modulated control signal being derived for a respective switching element from a manipulated variable provided by a regulator unit to regulate the output voltage, the method comprising:
    ascertaining a voltage curve on the plurality of switching elements continuously;
    switching on the plurality of switching elements are switched on, when a predetermined minimum period duration has been exceeded upon recognition of a voltage minimum of the ascertained voltage curve on the upon recognition of a voltage minimum of the ascertained voltage curve on the switching elements; and
    switching on the plurality of switching elements after passage of a predetermined maximum period duration, when no voltage minimum is established in the voltage curve on the plurality of switching elements until the passage of the predetermined maximum period duration.

2. The method as claimed in claim 1, wherein a sawtooth signal, which is generated by an oscillator unit, is utilized to generate the pulse-width-modulated and frequency-modulated control signals for the plurality of switching elements.

3. The method as claimed in claim 2, wherein a predeterminable offset value is added to the sawtooth signal.

4. The method as claimed in claim 1, wherein a switching-off point in time of a respective switching element is defined by the manipulated variable provided by the regulator unit, from which a respective pulse-width-modulated and frequency-modulated control signal is derived for the respective switching element.

5. The method as claimed in claim 1, wherein a manipulated variable specific for the respective switching element is derived from the manipulated variable provided by the regulator unit for regulating the output voltage as a function of the respective input voltage and the respective output voltage of the buck-boost converter to generate the respective pulse-width-modulated and frequency-modulated control signal for clocking the respective switching element.

6. The method as claimed in claim 1, wherein a voltage regulator having a subordinate current regulation is utilized as the regulator unit for regulating the output voltage of the buck-boost converter.

7. The method as claimed in claim 1, wherein an average current mode control is utilized as the regulator unit.

8. The method as claimed in claim 1, wherein a voltage measurement is performed on at least one switching element of the plurality of switching elements of the buck-boost converter to ascertain the voltage curve on the plurality of switching elements and to recognize a minimum of the voltage curve.

9. The method as claimed in claim 1, wherein a current curve through the inductance of the buck-boost converter is detected and evaluated to recognize a minimum of the voltage curve on the plurality of switching elements.

10. The method as claimed in claim 1, wherein a voltage curve on an auxiliary winding of the inductance of the buck-boost converter is detected and evaluated to recognize a minimum of the voltage curve on the switching elements.

11. The method as claimed in claim 1, wherein the predetermined minimum period duration, via which a maximum switching frequency for the switching elements is defined, is derivable based on a predeterminable efficiency for the buck-boost converter.

12. The method as claimed in claim 1, wherein the predetermined minimum period duration, via which a maximum switching frequency for the switching elements is defined, is derivable based on predeterminable maximum interference emissions in a specific frequency range for the buck-boost converter.

13. The method as claimed in claim 1, wherein the predetermined maximum period duration, via which a minimum switching frequency for the switching elements is defined, is ascertainable from a dynamic response of the regulator unit.

14. The method as claimed in claim 1, wherein the buck-boost converter is operated in a buck converter mode or in a mixed mode in dependence on the input voltage and output voltage; wherein in the buck converter mode, only a first switching element of the two switching elements is clocked as a buck converter switching element; and wherein in the mixed mode each of the plurality of switching elements are clocked.

15. The method as claimed in claim 1, wherein the buck-boost converter is operated in a continuous mode and in a discontinuous mode.

* * * * *